US012025594B2

United States Patent
Yokoi et al.

(10) Patent No.: US 12,025,594 B2
(45) Date of Patent: Jul. 2, 2024

(54) CHROMATOGRAPHY SYSTEM

(71) Applicant: SHIMADZU CORPORATION, Kyoto (JP)

(72) Inventors: Yusuke Yokoi, Kyoto (JP); Daisuke Kitabayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 871 days.

(21) Appl. No.: 17/048,671

(22) PCT Filed: Jan. 16, 2019

(86) PCT No.: PCT/JP2019/001001
§ 371 (c)(1),
(2) Date: Oct. 19, 2020

(87) PCT Pub. No.: WO2019/207850
PCT Pub. Date: Oct. 31, 2019

(65) Prior Publication Data
US 2021/0072199 A1    Mar. 11, 2021

(30) Foreign Application Priority Data

Apr. 25, 2018  (JP) ................ 2018-083602

(51) Int. Cl.
*G01N 30/30* (2006.01)
*G01N 30/16* (2006.01)
(Continued)

(52) U.S. Cl.
CPC ............. *G01N 30/30* (2013.01); *G01N 30/16* (2013.01); *G01N 30/32* (2013.01);
(Continued)

(58) Field of Classification Search
CPC ........ G01N 30/30; G01N 30/16; G01N 30/32; G01N 2030/027; G01N 2030/3084; G01N 2030/324; G01N 2030/326; G01N 30/8658
See application file for complete search history.

(56) References Cited

U.S. PATENT DOCUMENTS

2015/0253295 A1    9/2015  Ohashi
2017/0038347 A1*   2/2017  Tipler ..................... C25B 9/19
(Continued)

FOREIGN PATENT DOCUMENTS

CN    106896162 A  *  6/2017  ............ G01N 30/02
JP    03-243861 A       10/1991
(Continued)

OTHER PUBLICATIONS

International Search Report for corresponding Application No. PCT/JP2019/001001, mailed Apr. 16, 2019.
Written Opinion for corresponding Application No. PCT/JP2019/001001, mailed Apr. 16, 2019.
(Continued)

*Primary Examiner* — Tarun Sinha
*Assistant Examiner* — Drexel Alejandro Venero
(74) *Attorney, Agent, or Firm* — Renner, Otto, Boisselle & Sklar, LLP

(57) ABSTRACT

A chromatography system includes a liquid sending pump for sending a mobile phase in an analysis flow path, a sample injector that injects a sample into the analysis flow path, a separation column for separating the sample into components, a column oven for storing the separation column and adjusting a temperature of the separation column to a preset target temperature, a liquid sending controller configured to control an operation of the liquid sending pump, and a column protection flow rate setter configured to set a column protection flow rate. The liquid sending controller is configured to control the operation of the liquid sending pump (Continued)

such that, when the liquid sending pump starts sending the mobile phase, the flow rate of the mobile phase flowing through the analysis flow path does not exceed the column protection flow rate until a temperature in the column oven reaches the target temperature.

8 Claims, 3 Drawing Sheets

(51) Int. Cl.
    *G01N 30/32*     (2006.01)
    *G01N 30/02*     (2006.01)

(52) U.S. Cl.
    CPC .............. *G01N 2030/027* (2013.01); *G01N 2030/3084* (2013.01); *G01N 2030/324* (2013.01); *G01N 2030/326* (2013.01)

(56) References Cited

U.S. PATENT DOCUMENTS

2018/0202981 A1*   7/2018   De Malsche .......... G01N 30/32
2022/0326261 A1*  10/2022   Zhao .................... G01N 30/463

FOREIGN PATENT DOCUMENTS

| JP | 2006-023280 A | | 1/2006 |
|---|---|---|---|
| JP | 2006023280 A | * | 1/2006 |
| JP | 2007-040858 A | | 2/2007 |
| JP | 2015-166724 A | | 9/2015 |

OTHER PUBLICATIONS

Office Action for corresponding Chinese Patent Application No. 201980027424.8, dated Nov. 29, 2022, with English machine translation.

* cited by examiner

CHROMATOGRAPHY SYSTEM

TECHNICAL FIELD

The present invention relates to a chromatography system for carrying out liquid chromatography or supercritical fluid chromatography.

BACKGROUND ART

A chromatography system is constituted by a liquid sending pump that sends a mobile phase, an autosampler that injects a sample into an analysis flow path, a column oven that stores a separation column for separating the sample and adjusts a temperature of the separation column to a constant temperature and a detector for detecting a sample component into which the sample is separated in the separation column.

In the chromatography system, when a user sets conditions such as a liquid sending flow rate of the mobile phase by the liquid sending pump and a temperature of the column oven and inputs an instruction for starting an analysis, the sending liquid flow rate of the liquid sent by the liquid sending pump and the temperature in the column oven are adjusted to a target flow rate and a target temperature, respectively. Further, when the sending liquid flow rate and the temperature are stabilized at the target values, the sample is injected into the analysis flow path, and the analysis is started.

Meanwhile, it has been known that, in a case where the mobile phase suddenly flows into a separation column used for liquid chromatography and the like at a high flow rate, the separation column may be damaged, and separation performance may be negatively affected. Therefore, it is suggested that the flow rate of the mobile phase is increased gradually to the target flow rate when the mobile phase starts flowing into the separation column (see Patent Document 1).

CITATION LIST

Patent Document

[Patent Document 1] JP 2015-166724 A

SUMMARY OF INVENTION

Technical Problem

As the cause for damaging the separation column, the temperature of the separation column is mentioned in addition to the flow rate of the mobile phase flowing into the separation column. For example, in a case where the mobile phase flows through the separation column at a high flow rate with the temperature of the column oven not sufficiently increased at the time of activation of the analysis system, an excessive pressure is applied to the separation column, and the separation column is damaged. In order to solve this problem with a conventional analysis system, it was generally necessary that the user monitored the temperature of the column oven, figured out the time when the temperature of the column oven was sufficiently increased and caused the liquid sending pump to operate, or that the user set an operation of the liquid sending pump such that the flow rate of the mobile phase was increased gradually to the target flow rate.

In a case where the user figures out the time when the temperature of the column oven is sufficiently increased and causes the liquid sending pump to operate, when the temperature of the column oven is increased with the liquid sending pump completely stopped, the separation column may be excessively heated and be damaged. Thus, it is necessary for the user to gradually increase the set flow rate of the liquid sending pump while visually checking the temperature of the column oven, so that the operation is complicated.

Meanwhile, in a case where the operation of the liquid sending pump is set such that the flow rate of the mobile phase is increased gradually to the target flow rate, when the temperature of the column oven is not sufficiently increased for some reason such as a door of the column oven being left open, the mobile phase may be sent at a high flow rate from the liquid sending pump with the temperature of the separation column being low, so that the separation column may possibly be damaged.

As such, an object of the present invention is to reduce damage caused to a separation column when a mobile phase starts flowing.

Solution to Problem

A chromatography system according to the present invention includes an analysis flow path, a liquid sending pump for sending a mobile phase in the analysis flow path, a sample injector that injects a sample into the analysis flow path, a separation column provided at a position farther downstream than the sample injector on the analysis flow path and is to separate the sample that has been injected into the analysis flow path by the sample injector into components, a column oven that stores the separation column and adjusts a temperature of the separation column to a preset target temperature, a liquid sending controller configured to control an operation of the liquid sending pump such that a flow rate of the mobile phase flowing through the analysis flow path is a preset target flow rate, and a column protection flow rate setter configured to set a column protection flow rate that is lower than the target flow rate when the target flow rate is set. Further, the liquid sending controller is configured to control the operation of the liquid sending pump such that, when the liquid sending pump starts sending the mobile phase, the flow rate of the mobile phase flowing through the analysis flow path does not exceed the column protection flow rate until a temperature in the column oven reaches the target temperature.

In the preferred embodiment of the chromatography system according to the present invention, the liquid sending controller is configured to control the operation of the liquid sending pump such that the flow rate of the mobile phase flowing through the analysis flow path increases gradually to reach the column protection flow rate from a time when the liquid sending pump starts sending the mobile phase to a time when a preset first period of time elapses, confirm whether the temperature in the column oven has reached the target temperature after the flow rate of the mobile phase flowing through the analysis flow path reaches the column protection flow rate and control the operation of the liquid sending pump such that the flow rate of the mobile phase flowing through the analysis flow path increases gradually to reach the target flow rate from a time when it is confirmed that a temperature in the column oven has reached the target temperature to a time when a preset second period of time elapses. Thus, the flow rate of the mobile phase flowing through the separation column is increased gradually, so that an increase in pressure in the separation column becomes gradual, and the damage caused to the separation column is reduced.

Further, the liquid sending controller may be configured to control the operation of the liquid sending pump such that, in a case where the flow rate of the mobile phase flowing through the analysis flow path reaches the column protection flow rate before the temperature in the column oven reaches the target temperature, the flow rate of the mobile phase flowing through the analysis flow path is maintained at the column protection flow rate until the temperature in the column oven reaches the target temperature.

Advantageous Effects of Invention

In the chromatography system according to the present invention, when the liquid sending pump starts sending the mobile phase, the flow rate of the mobile phase flowing through the analysis flow path is controlled not to exceed the column protection flow rate that is set lower than the target flow rate until the temperature in the column oven reaches the set temperature. Thus, the mobile phase is prevented from flowing into the separation column at a high flow rate with the temperature in the separation column being low, and the damage caused to the separation column is reduced.

DESCRIPTION OF EMBODIMENTS

Figure 1:
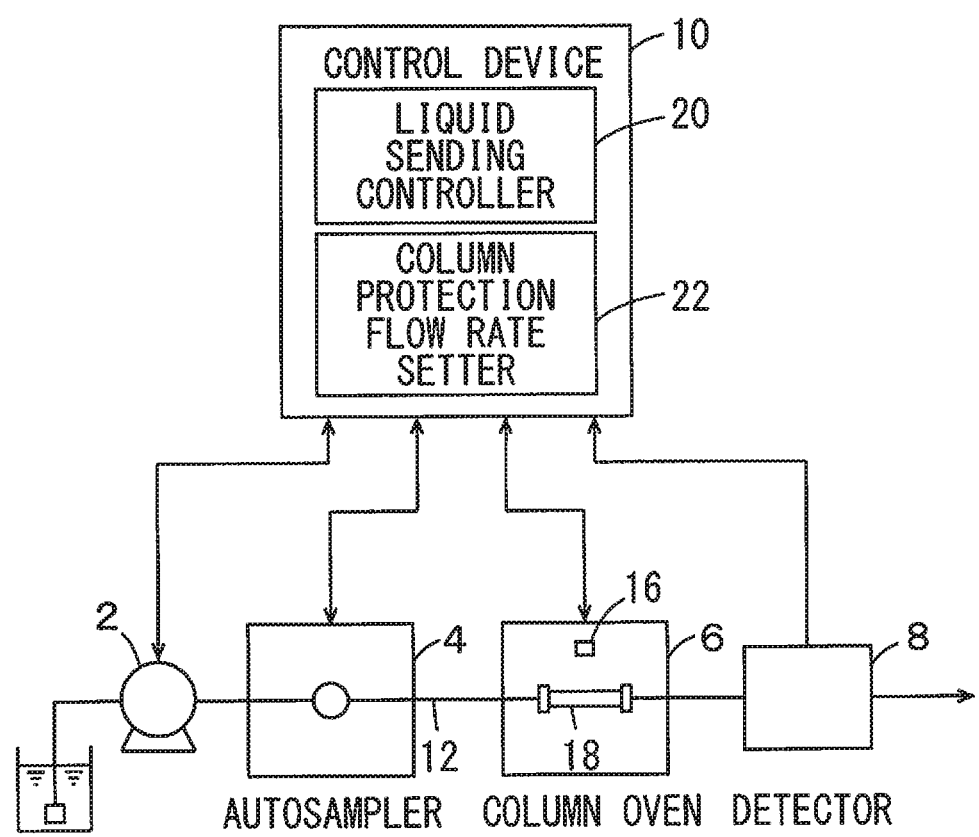
FIG. 1 A diagram showing the schematic configuration of one inventive example of a chromatography system.

One inventive example of a chromatography system will be described below with reference to the drawings. An analysis system for liquid chromatography will be described below as one example of the chromatography system.

The chromatography system of this inventive example includes a liquid sending pump 2, an autosampler 4 (sample injector), a column oven 6, a detector 8 and a control device 10. A separation column 18 is stored in the column oven 6. The liquid sending pump 2, the autosampler 4, the separation column 18 and the detector 8 are connected to one another in series by a pipe and constitute an analysis flow path 12 for liquid chromatography.

The liquid sending pump 2 is to send a mobile phase in the analysis flow path 12. The autosampler 4 is connected to a position farther downstream than the liquid sending pump 2 and injects a sample into the analysis flow path 12 through which the mobile phase flows. The separation column 18 is connected to a position farther downstream than the autosampler 4 and is to separate the sample that has been injected into the analysis flow path 12 by the autosampler 4 into components. The column oven 6 is to store the separation column 18 and adjust the temperature in the separation column 18 to a preset target temperature. The column oven 6 includes a heater (not shown) for heating the separation column 18 and a temperature sensor 16 for detecting the temperature in the space storing the separation column 18 or the temperature of the holder holding the separation column 18 as the temperature in the column oven 6. The detector 8 is connected to a position farther downstream than the separation column 18 and is to detect a sample component into which the sample is separated in the separation column 18.

The control device 10 manages operations of the liquid sending pump 2, the autosampler 4, the column oven 6 and the detector 8. The control device 10 can be realized by a dedicated computer or a general computer. Analysis conditions such as a target flow rate of the mobile phase and the target temperature of the separation column 18 are set with respect to the control device 10, and the control device 10 controls the operations of the liquid sending pump 2, the autosampler 4, the column oven 6 and the detector 8 based on the set analysis conditions.

The control device 10 includes a liquid sending controller 20 and a column protection flow rate setter 22. The liquid sending controller 20 and the column protection flow rate setter 22 are the functions obtained by execution of a program by an arithmetic element such as a microcomputer provided in the control device 10.

The liquid sending controller 20 controls an operating speed of the liquid sending pump 2 such that the flow rate of the mobile phase flowing through the analysis flow path 12 is the set target flow rate. Further, the liquid sending controller 20 is configured to increase the operating speed of the liquid sending pump 2 while monitoring the temperature in the column oven 6 detected by the temperature sensor 16 when the liquid sending pump 2 and the column oven 6 that are being stopped are started such as immediately after activation of the analysis system.

Specifically, until the temperature in the column oven 6 reaches the target temperature, the liquid sending controller 20 controls the operating speed of the liquid sending pump 2 such that the flow rate of the mobile phase does not exceed the column protection flow rate that is set lower than the target flow rate.

The column protection flow rate setter 22 is configured to set the column protection flow rate that is lower than the target flow rate when the target flow rate of the mobile phase is set. The column protection flow rate is half the target flow rate, for example.

Further, the control device 10 can set the flow rate of the mobile phase to gradually increase toward the column protection flow rate and the target flow rate. In that case, the user can set a first period T1 of time from the time when the liquid sending flow rate is 0 to the time when the liquid sending flow rate reaches the column protection flow rate and a second period T2 of time from the time when the liquid sending flow rate is the column protection flow rate to the time when the liquid sending flow rate reaches the target flow rate in the control device 10.

In a case where the periods T1, T2 of time are set, the liquid sending controller 20 controls the operating speed of the liquid sending pump 2 such that the liquid sending flow rate is the column protection flow rate when the period T1 of time elapses from the time when the operation of the liquid sending pump 2 is started, and controls the operating speed of the liquid sending pump 2 such that the liquid sending flow rate is the target flow rate when the period T2 of time elapses from the time when the temperature in the column oven 6 reaches the target temperature.

Figure 2:
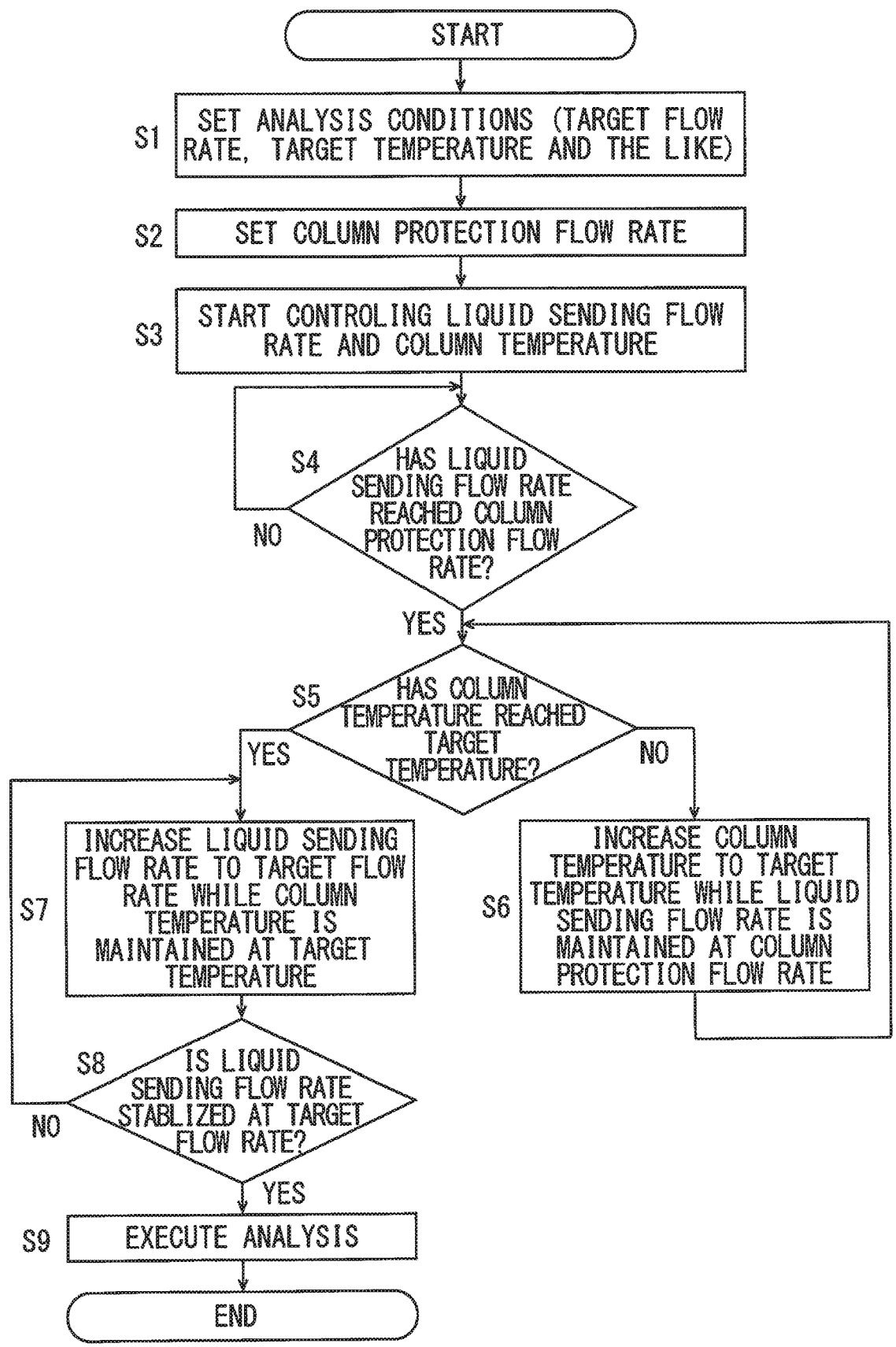
FIG. 2 A flowchart showing one example of a series of operations from activation of the system to an analysis in the same inventive example.
Figure 3:
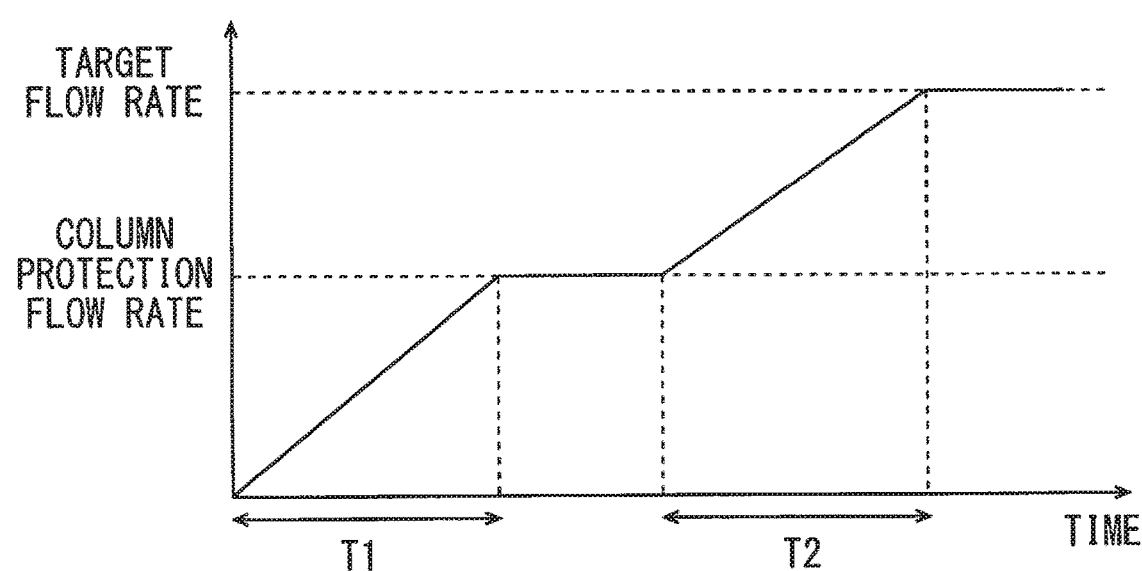
FIG. 3 A graph showing one example of the temporal change of a flow rate until the flow rate of a mobile phase is stabilized at a target flow rate in the same inventive example.

The operation after activation of the analysis system of this inventive example will be described with reference to FIG. 1, the flow chart of FIG. 2 and the graph of FIG. 3.

When the analysis system is activated, and the user sets the analysis conditions such as the target flow rate of the mobile phase, the times T1, T2 of time and the target temperature in the column oven 6 with respect to the control device 10 (step S1), the column protection flow rate setter 22 sets the column protection flow rate that is lower than the target flow rate (step S2). When the target flow rate and the target temperature are set, an operation of sending liquid by the liquid sending pump 2 and an operation of increasing the temperature in the column oven 6 are started. In the column oven 6, the feedback control of the output of a heater is carried out such that the internal temperature detected by the temperature sensor 16 is the target temperature. Meanwhile, the liquid sending controller 20 gradually increases the operating speed of the liquid sending pump 2 such that the liquid sending flow rate becomes the column protection flow rate after an elapse of the period T1 of time (step S3).

When the liquid sending flow rate of the liquid sending pump 2 reaches the column protection flow rate (step S4), the liquid sending controller 20 determines whether the temperature in the column oven 6 (column temperature) has reached the target temperature (step S5). When the detection temperature of the temperature sensor 16 reaches the target temperature, the column oven 6 transmits a preparation completing signal indicating that preparation of the separation column 18 is completed to the control device 10. Therefore, the liquid sending controller 20 can determine whether the temperature in the column oven 6 has reached the target temperature based on presence or absence of the preparation completing signal from the column oven 6. In a case where the temperature in the column oven 6 has not reached the target temperature, the liquid sending controller 20 controls the operating speed of the liquid sending pump 2 such that the liquid sending flow rate is maintained at the column protection flow rate until the temperature in the column oven 6 reaches the target temperature (step S6).

When the temperature in the column oven 6 reaches the target temperature, the liquid sending controller 20 gradually increases the operating speed of the liquid sending pump 2 such that the liquid sending flow rate becomes the target flow rate after an elapse of the period T2 of time (step S7). After the liquid sending flow rate reaches the target flow rate, the liquid sending controller 20 controls the operating speed of the liquid sending pump 2 such that liquid sending flow rate is stabilized at the target flow rate. After confirming that 5 the liquid sending flow rate of the liquid sending pump 2 is stabilized at the target flow rate (step S8), the control device 10 causes the autosampler 4 to inject a sample and carries out an analysis (step S9).

As described above, in this inventive example, the liquid sending flow rate of the liquid sending pump 2 is increased gradually to the column protection flow rate that is lower than the target flow rate, and the liquid sending flow rate does not exceed the column protection flow rate until the temperature in the column oven 6 (the temperature of the separation column 18) reaches the target temperature. Therefore, the mobile phase is prevented from flowing at a high flow rate into the separation column 18 that is not sufficiently heated. Thus, the damage caused to the separation column 18 when the mobile phase starts flowing is reduced.

While the above-mentioned inventive example is the analysis system for liquid chromatography, the present invention is not limited to this. The present invention can be applied to an analysis system for supercritical fluid chromatography.

REFERENCE SIGNS LIST

2 Liquid sending pump
4 Autosampler
6 Column oven
8 Detector
10 Control device
12 Analysis flow path
16 Temperature sensor
18 Separation column
20 Liquid sending controller
22 Column protection flow rate setter

The invention claimed is:

1. A chromatography system comprising:
an analysis flow path;
a liquid sending pump for sending a mobile phase in the analysis flow path;
a sample injector that injects a sample into the analysis flow path;
a separation column provided at a position farther downstream than the sample injector on the analysis flow path to separate the sample that has been injected into the analysis flow path by the sample injector into components;
a column oven that stores the separation column and adjusts a temperature of the separation column to a preset target temperature;
a temperature sensor that detects a temperature in the column oven;
a liquid sending controller configured to control an operation of the liquid sending pump such that a flow rate of the mobile phase flowing through the analysis flow path is a preset target flow rate; and
a column protection flow rate setter configured to set a column protection flow rate that is lower than the target flow rate when the target flow rate is set,
wherein the liquid sending controller is configured to:
control the operation of the liquid sending pump such that, when the liquid sending pump starts sending the mobile phase, the flow rate of the mobile phase flowing through the analysis flow path does not exceed the column protection flow rate until the temperature in the column oven reaches the target temperature,
control the operation of the liquid sending pump such that the flow rate of the mobile phase flowing through the analysis flow path increases gradually to reach the column protection flow rate from a time when the liquid sending pump starts sending the mobile phase,
confirm whether the temperature in the column oven has reached the target temperature after the flow rate of the mobile phase flowing through the analysis flow path reaches the column protection flow rate, and
control the operation of the liquid sending pump such that the flow rate of the mobile phase flowing through the analysis flow path increases gradually to reach the target flow rate from a time when it is confirmed that the temperature detected by the temperature sensor has reached the target temperature.

2. The chromatography system according to claim 1, wherein the liquid sending controller is configured to:
control the operation of the liquid sending pump such that the flow rate of the mobile phase flowing through the analysis flow path increases gradually to reach the column protection flow rate from the time when the liquid sending pump starts sending the mobile phase to a time when a preset first period of time elapses, and
control the operation of the liquid sending pump such that the flow rate of the mobile phase flowing through the analysis flow path increases gradually to reach the target flow rate from the time when it is confirmed that the temperature detected by the temperature sensor has reached the target temperature to a time when a preset second period of time elapses.

3. The chromatography system according to claim 2, wherein the first period of time and/or the second period of time are to be set by a user.

4. The chromatography system according to claim 1, wherein the liquid sending controller is configured to control the operation of the liquid sending pump such that, in a case where the flow rate of the mobile phase flowing through the analysis flow path reaches the column protection flow rate before the temperature in the column oven reaches the target temperature, the flow rate of the mobile phase flowing through the analysis flow path is maintained at the column protection flow rate until the temperature in the column oven reaches the target temperature.

5. The chromatography system according to claim 1, wherein the column protection flow rate setter is configured to set half the target flow rate as the column protection flow rate.

6. The chromatography system according to claim 1, wherein
    the column oven is configured to output a preparation completing signal indicating that preparation of the separation column has completed when the temperature in the column oven reaches the target temperature, and
    the liquid sending controller is configured to determine whether the temperature in the column oven has reached the target temperature based on presence or absence of the preparation completing signal from the column oven.

7. The chromatography system according to claim 1, wherein the liquid sending controller
    determines whether the temperature in the column oven has reached the target temperature when the flow rate of the mobile phase flowing through the analysis flow path reaches the column protection flow rate,
    controls the operation of the liquid sending pump such that the flow rate of the mobile phase flowing through the analysis flow path is maintained at the column protection flow rate, in a case where it is determined that the temperature in the column oven has not reached the target temperature, and
    controls the operation of the liquid sending pump such that the flow rate of the mobile phase flowing through the analysis flow path is the target flow rate, in a case where it is determined that the temperature in the column oven has reached the target temperature.

8. The chromatography system according to claim 1, wherein the column protection flow rate setter is configured to set the column protection flow rate based on the target flow rate.

* * * * *